Jan. 14, 1930.  J. W. CONNELL  1,743,913
INLAID ADVERTISING FRAME
Filed March 7, 1928   2 Sheets-Sheet 1

Inventor
J.W.Connell.
By
Attorney.

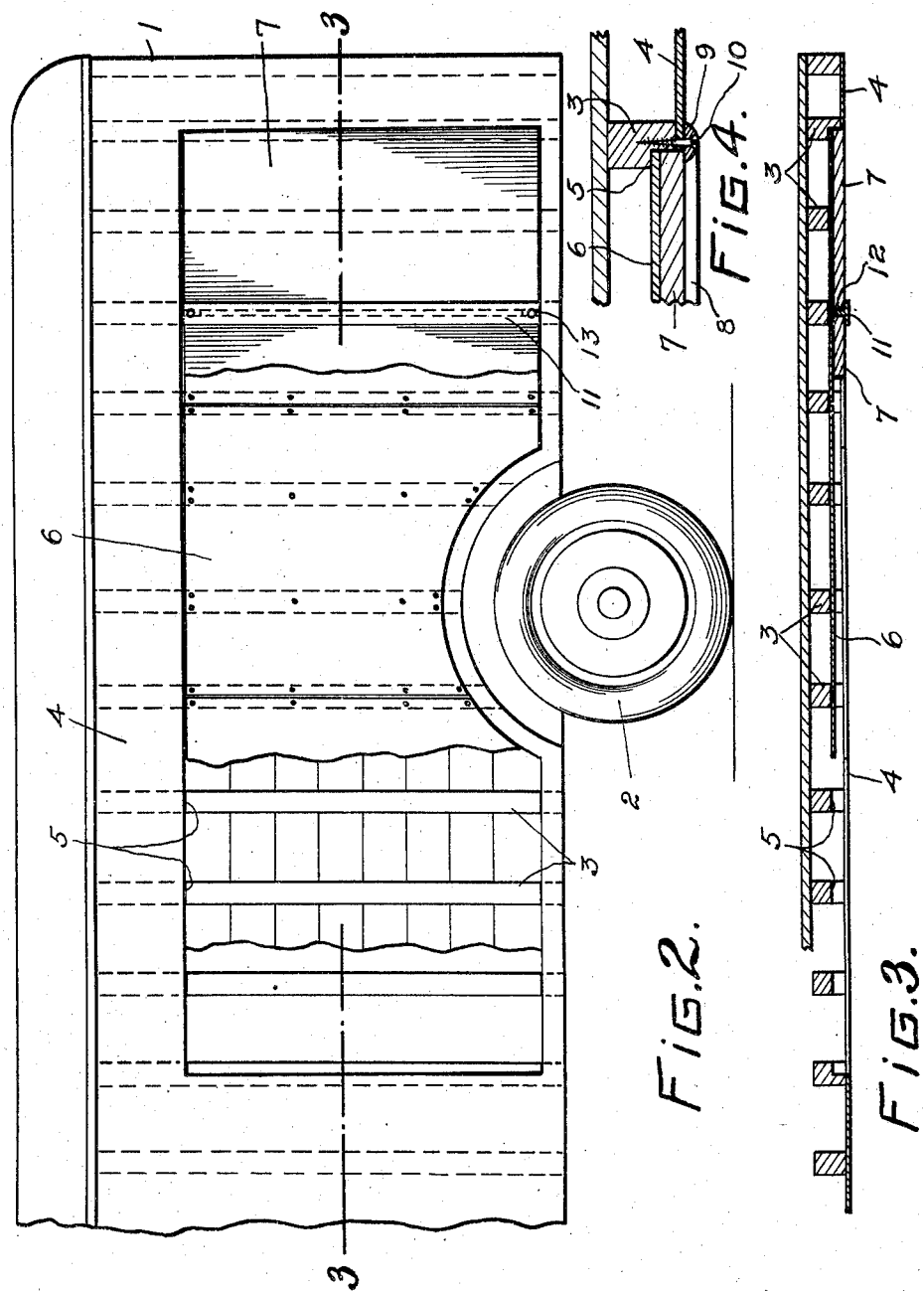

Patented Jan. 14, 1930

1,743,913

UNITED STATES PATENT OFFICE

JOHN WILSON CONNELL, OF MONTREAL, QUEBEC, CANADA, ASSIGNOR TO PUBLIBUS LIMITED, OF MONTREAL, QUEBEC, CANADA

INLAID ADVERTISING FRAME

Application filed March 7, 1928. Serial No. 259,758.

The present invention relates to improvements in an inlaid advertising frame for vehicles, which is hereinafter fully described and claimed and is illustrated in the accompanying drawings, in which:—

Figure 2 is a segmentary side elevation of a vehicle body, illustrating the construction of the inlaid frame.

Figure 3 is a longitudinal section on line 3—3 of Figure 2.

Figure 4 is an enlarged segmentary sectional view through one edge of the frame.

Figure 1:
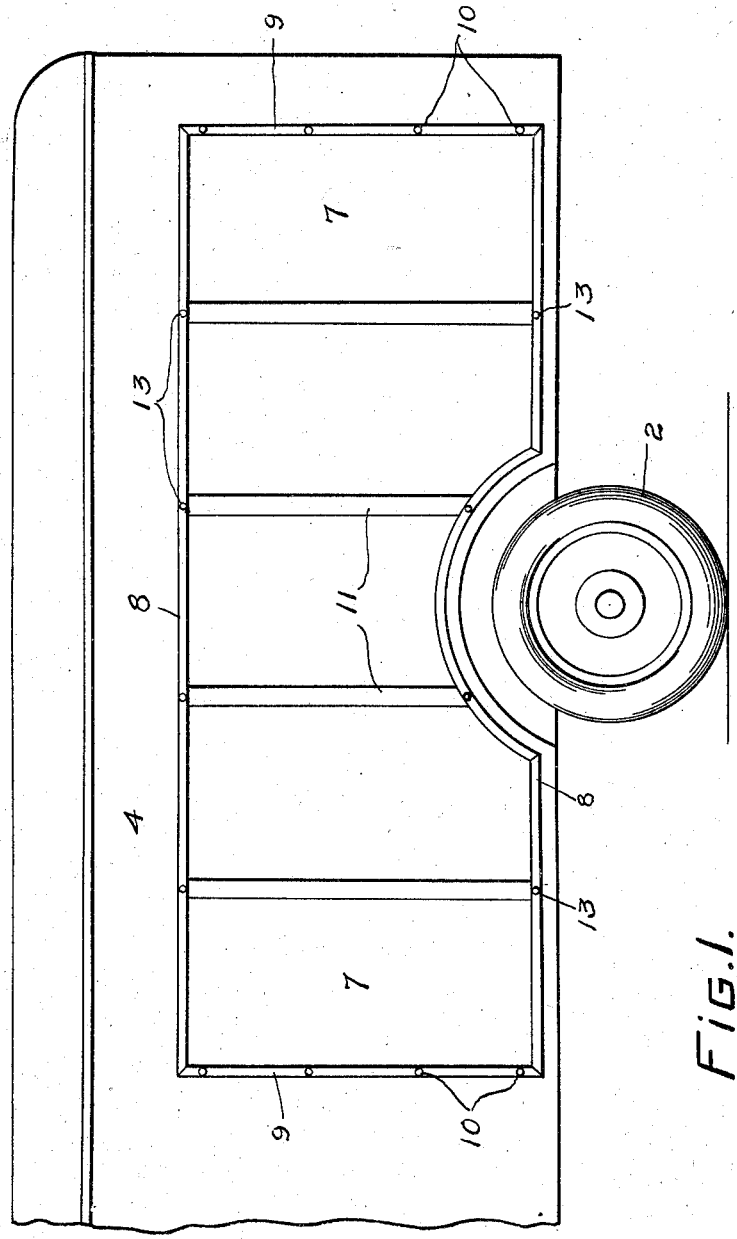
Figure 1 is a segmentary side elevation of a vehicle body in which is adapted a frame, according to the invention.

The main object of the invention is to provide an advertising frame which is inserted into the sides of the vehicle body, so that the frame of the advertising panels will not project outwardly, and so that the advertising panels will be flush with the outer sides of the body, thus enhancing the appearance of the vehicle.

Another object, in building-in the body, the advertising frame, is to simplify the frame construction and thus considerably reduce its cost.

Like numerals of reference indicate corresponding parts in each figure.

Referring to the drawings, 1 is the outerside of the body of a vehicle and 2 indicates one of the rear wheels. The body of a vehicle usually consists of a frame composed of a plurality of vertical struts 3, covered on the outerside by sheet metal plate 4 or any other suitable material. A relatively large open and depressed space is provided, intermediate of said body, by cutting-in at 5 the struts 3, and in the bottom of said recessed portion of the struts are suitably secured, over said struts, the sheet metal plates 6. The recess thus formed is adapted to receive a plurality of panels 7, which are preferably of the thickness of the recess and fit flush with the outer side of the body.

When the panels 7, carrying advertising matter thereon, are in position, they are secured in the recess by means of the horizontal strips 8 and the vertical strips 9, which are suitably secured on the edge of the recess by means of the screws 10, said strips 8 and 9 extending inwardly over said recess, to overlap the edges of the panels 7, thus securing said panels in position.

Between each panel 7 is also provided a dividing bar 11, which has a projecting longitudinal central flange 12 adapted to engage between the meeting edges of the panels and said bars 11 are secured in the top edge and lower edge of the said recess by means of the screws 13, which serve, at the same time, to secure the strips 8 to the body of the vehicle.

To remove the panels 7, the strips 8 and 9 and the dividing bars 11 are preferably removed by inscrewing the screws 10 and 12.

It should be understood that the bottom of said recess can be left uncovered, without departing from the spirit and scope of the present invention. The recess being fully covered by the panels, it is not absolutely necessary to provide it with a cover, although it is preferable to do so. It must also be understood that the dividing bars are eliminated when one panel only is used that covers the recess. The accompanying claims, are, therefore, drawn to broadly cover these features.

What I claim as my invention is:—

1. An advertising frame, in combination with a vehicle body, consisting of a plurality of struts, a recess provided in a plurality of said struts, means to cover said struts around said recess, means secured to the bottom of the recess in said struts to cover said recess, a panel mounted in said recess, the edges of said panel being flush with the edges of said recess, and strips secured on the edges of said recess, adapted to overlap the edges of said panel to secure said panel in said recess.

2. An advertising frame, in combination with a vehicle body, consisting of a plurality of struts, a recess provided in a plurality of said struts, means to cover said struts around said recess, means upon said struts to cover the bottom of said recess, a plurality of panels mounted in said recess, a dividing bar mounted between said panels, strips on the edges of said recess overlapping the edges of said panels, and means to secure said dividing bars and said strips to the body of said vehicle.

Signed at Montreal, Quebec, Canada, this 4th day of January, 1928.

JOHN WILSON CONNELL.